US010667313B2

(12) United States Patent
Maguire et al.

(10) Patent No.: US 10,667,313 B2
(45) Date of Patent: May 26, 2020

(54) WIRELESS COMMUNICATION SYSTEM AND METHOD FOR MONITORING THE PAIRING STATUS BETWEEN TWO DEVICES

(71) Applicant: Knowmadics, Inc., Herndon, VA (US)

(72) Inventors: Paul Maguire, Manassas, VA (US);
Claire Ostrum, Leesburg, VA (US)

(73) Assignee: KNOWMADICS, INC., Herndon, VA (US)

( * ) Notice: Subject to any disclaimer, the term of this patent is extended or adjusted under 35 U.S.C. 154(b) by 0 days.

(21) Appl. No.: 16/565,702

(22) Filed: Sep. 10, 2019

(65) Prior Publication Data

US 2020/0008252 A1 Jan. 2, 2020

Related U.S. Application Data

(63) Continuation of application No. 15/811,708, filed on Nov. 14, 2017, now Pat. No. 10,455,633.

(51) Int. Cl.
*H04W 76/14* (2018.01)
*H04W 12/10* (2009.01)
(Continued)

(52) U.S. Cl.
CPC ............ *H04W 76/14* (2018.02); *H04W 4/70* (2018.02); *H04W 4/80* (2018.02); *H04W 12/10* (2013.01);
(Continued)

(58) Field of Classification Search
CPC ............ G08B 21/0202; G08B 21/0205; G08B 21/0213; G08B 21/0277; G08B 21/22;
(Continued)

(56) References Cited

U.S. PATENT DOCUMENTS 5,189,395 A 2/1993 Mitchell
5,223,815 A 6/1993 Rosenthal et al.
(Continued)

FOREIGN PATENT DOCUMENTS

| CA | 2831534 | 4/2014 |
| CN | 1558690 | 12/2004 |
| WO | WO 2016138146 | 8/2016 |

OTHER PUBLICATIONS

File history of the Re-Examination of U.S. Pat. No. 8,265,597—Reexamination Control No. 90/013,020 filed on Oct. 8, 2013 (490 pages).
(Continued)

*Primary Examiner* — Devan A Sandiford
(74) *Attorney, Agent, or Firm* — Nixon & Vanderhye PC

(57) ABSTRACT

A watch comprises a communication circuitry configured to enable short-range communication between the watch and the portable electronic device, and a processing system including a processor. The processing system is configured to establish a pairing with the portable electronic device through a short-range pairing mechanism, determine whether the pairing with the portable electronic device is broken based on information received from the portable electronic device, and in response to the determination that the pairing with the portable electronic device is broken, transmit information indicating the breakage of the pairing to the server directly or via the portable electronic device.

28 Claims, 10 Drawing Sheets

(51) Int. Cl.
    *H04W 4/70* (2018.01)
    *H04W 4/80* (2018.01)
    *H04W 84/18* (2009.01)
    *H04W 72/04* (2009.01)

(52) U.S. Cl.
    CPC ........ *H04W 84/18* (2013.01); *H04W 72/0406* (2013.01)

(58) Field of Classification Search
    CPC ............ G08B 13/1427; H04M 1/7253; H04M 2250/02; H04M 11/04; H04M 1/72536; H04M 2242/04; H04W 76/14; H04W 4/80; H04W 8/005; H04W 4/90; H04W 76/50; H04H 20/59
    See application file for complete search history.

(56) References Cited

U.S. PATENT DOCUMENTS

| | | |
|---|---|---|
| 6,262,666 B1 | 7/2001 | Lodichand |
| 7,064,669 B2 | 6/2006 | Light et al. |
| 7,259,671 B2 | 8/2007 | Ganley et al. |
| 7,813,715 B2 | 10/2010 | McKillop et al. |
| 7,873,349 B1 | 1/2011 | Smith |
| 8,140,012 B1 | 3/2012 | Causey |
| 8,165,560 B2 | 4/2012 | Stenquist |
| 8,265,597 B2 | 9/2012 | Smith |
| 8,311,515 B1 | 11/2012 | Smith |
| 8,457,596 B2 | 6/2013 | Smith |
| 8,515,505 B1 | 8/2013 | Pattikonda |
| 8,606,230 B2 | 12/2013 | Smith |
| 8,639,650 B1 | 1/2014 | Gill |
| 8,661,244 B2 | 2/2014 | Jung et al. |
| 8,768,251 B2 | 7/2014 | Claus et al. |
| 8,878,670 B2 | 11/2014 | Rosen et al. |
| 9,002,372 B2 | 4/2015 | Shakespeare |
| 9,111,433 B2 | 8/2015 | Curatolo et al. |
| 9,171,419 B2 | 10/2015 | Dion et al. |
| 9,210,727 B2 | 12/2015 | Widner |
| 9,210,733 B2 | 12/2015 | Russell et al. |
| 9,313,313 B2 | 4/2016 | Ketari |
| 9,451,649 B2 | 9/2016 | Sinha et al. |
| 9,520,045 B2 | 12/2016 | Hawkins |
| 9,646,477 B2 | 5/2017 | Fernandez et al. |
| 9,712,576 B1 | 7/2017 | Gill |
| 9,713,174 B2 | 7/2017 | Kuehnel et al. |
| 9,715,815 B2 | 7/2017 | Verma |
| 9,807,183 B2 | 10/2017 | Maguire |
| 2003/0218539 A1* | 11/2003 | Hight ................ G08B 21/0244 340/539.13 |
| 2004/0178906 A1 | 9/2004 | Vaughan |
| 2004/0233930 A1 | 11/2004 | Colby |
| 2004/0235514 A1 | 11/2004 | Bloch |
| 2005/0085257 A1 | 4/2005 | Laird |
| 2005/0280546 A1 | 12/2005 | Ganley |
| 2006/0083187 A1 | 4/2006 | Dekel |
| 2007/0123166 A1 | 5/2007 | Sheynman et al. |
| 2007/0162576 A1 | 7/2007 | Sinclair |
| 2007/0224980 A1 | 9/2007 | Wakefield |
| 2007/0285258 A1 | 12/2007 | Hartman |
| 2007/0294177 A1 | 12/2007 | Volk |
| 2008/0061993 A1 | 3/2008 | Fong |
| 2008/0068130 A1 | 3/2008 | Batta |
| 2008/0189162 A1 | 8/2008 | Ganong |
| 2009/0005068 A1 | 1/2009 | Forstall |
| 2009/0143048 A1 | 6/2009 | Ayanamcottil |
| 2009/0150543 A1 | 6/2009 | Wada |
| 2009/0265552 A1 | 10/2009 | Moshir |
| 2009/0326381 A1 | 12/2009 | Yuan |
| 2010/0205187 A1 | 8/2010 | Bertagna |
| 2010/0234100 A1 | 9/2010 | Gagner |
| 2010/0324936 A1 | 12/2010 | Vishnubhatla |
| 2011/0012729 A1 | 1/2011 | Hess |
| 2011/0081860 A1 | 4/2011 | Brown et al. |
| 2011/0319051 A1 | 12/2011 | Reitnour |
| 2012/0083208 A1 | 4/2012 | Giles et al. |
| 2012/0084352 A1 | 4/2012 | Cho |
| 2012/0084773 A1 | 4/2012 | Lee |
| 2012/0322380 A1 | 12/2012 | Nannarone |
| 2013/0046847 A1 | 2/2013 | Zavesky |
| 2013/0084882 A1 | 4/2013 | Khorashadi |
| 2013/0088615 A1 | 4/2013 | Altieri |
| 2013/0102253 A1 | 4/2013 | Marsh |
| 2013/0124244 A1 | 5/2013 | Johnson |
| 2013/0135097 A1* | 5/2013 | Doezema .......... G08B 21/0446 340/539.13 |
| 2013/0159330 A1 | 6/2013 | Smith |
| 2013/0183924 A1 | 7/2013 | Saigh |
| 2013/0225127 A1 | 8/2013 | Cavacuiti |
| 2013/0231851 A1 | 9/2013 | Chen |
| 2013/0307684 A1 | 11/2013 | Pallotta |
| 2014/0099998 A1 | 4/2014 | Smith |
| 2014/0125525 A1 | 5/2014 | Kane |
| 2014/0253319 A1 | 9/2014 | Chang |
| 2014/0256250 A1 | 9/2014 | Cueto et al. |
| 2014/0267934 A1 | 9/2014 | Hardin |
| 2014/0278850 A1 | 9/2014 | Boccuzzi |
| 2014/0372160 A1 | 12/2014 | Nath |
| 2015/0052485 A1 | 2/2015 | Grounds |
| 2015/0156567 A1 | 6/2015 | Oliver |
| 2015/0163312 A1 | 6/2015 | Maguire et al. |
| 2015/0227999 A1 | 8/2015 | Maguire et al. |
| 2015/0256423 A1 | 9/2015 | Stearns |
| 2016/0072918 A1 | 3/2016 | Gabrelyanov |
| 2016/0117903 A1 | 4/2016 | Striemer |
| 2016/0133118 A1 | 5/2016 | Forchione et al. |
| 2016/0150350 A1 | 5/2016 | Ingale et al. |
| 2016/0157074 A1 | 6/2016 | Joao |
| 2016/0196432 A1 | 7/2016 | Main |
| 2016/0360341 A1 | 12/2016 | Srivatsa et al. |
| 2016/0379459 A1 | 12/2016 | Trang |
| 2017/0078837 A1 | 3/2017 | Liang |
| 2017/0325065 A1 | 11/2017 | Azam |
| 2019/0150203 A1 | 5/2019 | Maguire |

OTHER PUBLICATIONS

Mobile Phones as Computing Devices: "The Viruses are Coming!" by David Dagon, Tom Martin, and Thad Stamer, published in *Pervasive Computing*, published by the IEEE CS and IEEE ComSoc, 2004 (5 pages).
"How to Tell If Your Cell Phone Is Bugged" by Lauren Weinstein (Vortex Technology), published as http://lauren.vortex.com/archive/000202.html; Dated Dec. 3, 2006 (3 pages).
"FlexiSPY PRO-X, FLEXISPY" [online], published Apr. 24, 2008 [retrieved on Sep. 2, 2013]. Retrieved from the Intenet:<URL: http://wayback.archive.org/web/20080409170704/http://www.flexispy.com/faq.htrn#03.> (and linked 15 pages).
"*Fake Shutdown* 1.0", NONAGS [online] published Nov. 12, 2001 [retrieved on Sep. 6, 2013]. Retrieved from the internet <URL: http://www.nonags.com/freeware-fake-shutdown969.html>.
"Stealthy Video Capturer: A New Video-based Spyware in 3G Smartphones" by Nan Xu et. al., Source: Proceedings of the Second ACM Conference on Wireless Network Security, pp. 69-78, 2009.
FBI Taps Cell Phonemic as Eavesdropping Tool; by Declan McCullagh; Conet News, Source: http://news.cnet.com/2100-1029-6140191.html; Dated Dec. 1, 2006 (14 pages).
Maguire et al., Office Action dated Oct. 24, 2016 issued in related U.S. Appl. No. 14/561,564 (12 pages).
Stach, et al., "Candy Castle, A Prototype for Pervasive Health Games" PerCom Demos, 2012, Lugano (Mar. 20, 2012) (pp. 501-503).
Maguire et al., Office Action dated Aug. 22, 2017 issued in U.S. Appl. No. 14/620,491 (19 pages).
Maguire et al., U.S. Appl. No. 14/561,564, filed Dec. 5, 2014, entitled "Crowd-Sourced Computer-Implemented Methods and Systems of Collecting and Transforming Portable Device Data" (44 pages).

(56) References Cited

OTHER PUBLICATIONS

Maguire et al., U.S. Appl. No. 14/620,491, filed Feb. 12, 2015, entitled "Crowd-Sourced Computer-Implemented Methods and Systems of Collecting Requested Data" (48 pages).
Examiner's Report issued in Canadian Application No. 2,989,010 dated Oct. 18, 2018 (3 pages).
Maguire et al., Office Action dated Dec. 13, 2018 issued in related U.S. Appl. No. 15/811,708 (21 pages).

* cited by examiner

WIRELESS COMMUNICATION SYSTEM AND METHOD FOR MONITORING THE PAIRING STATUS BETWEEN TWO DEVICES

CROSS REFERENCE TO RELATED APPLICATION

This application is a continuation application of application Ser. No. 15/811,708, filed on Nov. 14, 2018, the entire content of which is incorporated into the present application by reference. The application incorporates by reference the entire content of U.S. application Ser. No. 14/561,564 filed on Dec. 5, 2014, now U.S. Pat. No. 9,807,183, issued Oct. 31, 2017, which claims the benefit of Provisional Application No. 61/914,755 filed on Dec. 11, 2013, Provisional Application No. 61/912,944 filed on Dec. 6, 2013 and Provisional Application No. 61/912,337 filed on Dec. 5, 2013.

This application incorporates by reference the entire content of U.S. application Ser. No. 14/620,491 filed on Feb. 12, 2015, which claims the benefit of Provisional Application No. 61/938,812 filed on Feb. 12, 2014.

FIELD OF THE DISCLOSURE

Certain example embodiments disclosed herein relate generally to pairing devices via a short-range pairing mechanism, and more particularly, certain example embodiments disclosed herein to systems, methods and techniques for monitoring and alerting the breakage of a pairing between an electronic device and a third party device.

SUMMARY

An individual like a law enforcement officer or other investigators may carry a portable electronic device to secretly record conversations or video events of a suspect. It is therefore useful to detect attempts to remove the portable electronic device from the individual. Moreover, in situations where the portable electronic device is stolen or seized, immediate notification of the situation to another law enforcement officer, an emergency response vehicle or an emergency care facility is also desired to maintain the safety of the individual.

To detect attempts to remove a portable electronic device from an individual, the portable electronic device may be operable to initiate a short-range pairing with another device and then periodically check a status state of the pairing. An electronic device may be operated by an individual who may potentially be in danger, and another device to be paired with the electronic device may be a device or an item associated with the individual, such as, a badge, a Wi-Fi-enabled watch, a health device, jewelry, or the like. In monitoring the breakage of its pairing with the other device, the electronic device may periodically attempt to detect a signal from the other device. For example, the electronic device may monitor the breakage of the pairing through detecting a change in distance, shutting off the Blue Tooth or other signal on the $3^{rd}$ party device, or the breakage of the pairing may also be detected through activating a pre-built button on the $3^{rd}$ party device and interpreting that action as a panic or duress call on the App and/or server. If the number of times that the signal was undetected exceeds a threshold, then the attempting electronic device can perform operations like locking itself or raising an alarm indicating that the wireless leash was broken.

However, when an investigator is engaging in covert intelligence gathering missions during which suspects are secretly recorded by a phone carried by the investigator, raising an alarm by the phone itself would make the suspects aware that they might be secretly recorded. Therefore, to provide the greatest degree of security, it is desired for an electronic device carried by an investigator to transmit a notification to a remote server immediately and automatically in the case of an emergency situation, such as the seizure of the portable electronic device from the investigator in an abduction situation. Moreover, it is also desired for the remote server to issue a command to the electronic device to request for appropriate actions, such as wiping out the recorded data and relevant application. For example, the remote server may guide the electronic device to take actions based on particular situations and/or data gathered from other sources. In certain example embodiments, the remote server may also notify other persons of the seizure of the electronic device, thereby the other persons may take appropriate actions or act in accordance with specific commands issued by the remote server.

Some example embodiments are directed to a security system for monitoring a pairing established between two devices via a short-range pairing mechanism, such as Bluetooth, near field communication, infrared, Zigbee, or Wi-Fi. The security system comprises a server and an electronic device. Examples of the electronic device may include a mobile phone, a laptop, a tablet, or the like. The electronic device includes a transmitter configured to transmit data to the server, a receiver configured to receive data from the server, and a processing system including a processor. The processing system of the electronic device is configured to establish a pairing between the electronic device and a third party device through the short-range pairing mechanism, to receive information from the third party device via the short-range pairing mechanism, and to determine whether the pairing with the third party device is broken. Examples of the third party device may include a health device, a mobile phone, a laptop, a Wi-Fi-enabled vehicle, a watch, jewelry, or the like.

Moreover, the processing system of the electronic device is further configured to, in response to the determination that the pairing with the third party device is broken, transmit information indicating the breakage of the pairing to the server. On the other hand, the server is configured to receive the information indicating the breakage of the pairing from the electronic device.

It is envisioned that the server in one example embodiment is further configured to send a message or issue a command to one or more other electronic devices after receiving the information indicating the breakage of the pairing between the electronic device and the third party device. The message sent to the one or more other electronic devices by the server may indicate the breakage of the pairing between the electronic device and the third party device. Examples of the command sent to the one or more other electronic devices may request the other electronic devices to take appropriate actions in response to the breakage of the pairing. For example, the server may send a message to notify a law enforcement officer of the dangerous situation of an investigator or request an emergency response team to take appropriate actions to rescue the investigator.

In another example embodiment, the server is further configured to issue a command to the electronic device after receiving the information indicating the breakage of the pairing. In the example embodiment, the electronic device may be one of the end point devices of a crowd-sourced cloud system, and the processing system of the electronic device is further configured to execute a crowd source application, which, upon execution, enables the electronic device to upload collected data to the server. In this example embodiment, the server is further configured to issue a command to the electronic device for wiping out the crowd source application. As such, even if the investigator's phone was seized by a suspect, the suspect could not tell that she/he was secretly recorded.

In yet another example embodiment, in initiating a pairing with a third party device, the processing system of the electronic device is further configured to set the electronic device in a pairing mode, to discover one or more third party devices in the vicinity of the electronic device through the short-range pairing mechanism, to display the one or more discovered third party devices, and to display a user interface enabling selecting one third party device to be paired with the electronic device from the one or more discovered third party devices. Alternatively, a pairing between the electronic device and the third party device may be initiated by any other kinds of procedures.

In certain example embodiments, the processing system of the electronic device is further configured to periodically receive a heartbeat from the third party device after the pairing with the third party device is established, in checking whether the pairing with the third party device is broken. In alternative example embodiments, in checking whether the pairing with the third party device is broken, the processing system of the electronic device is further configured to request for a response from the third party device after the pairing with the third party device is established.

Some example embodiments are directed to an electronic device included in a security system, which comprises a server. The electronic device comprises a transmitter configured to transmit data to a server, a receiver configured to receive data from the server, and a processing system including a processor. The processing system of the electronic device is configured to establish a pairing with a third party device through a short-range pairing mechanism, to receive information from the third party device via the short-range pairing mechanism, to determine whether the pairing with the third party device is broken, and, in response to the determination that the pairing with the third party device is broken, to transmit information indicating the breakage of the pairing to the server.

In one example embodiment, the processing system of the electronic device is further configured to wipe out an application on the electronic device upon receipt of a command from the server, after transmitting the information indicating the breakage of the pairing.

In another example embodiment, the electronic device is configured to periodically receive a heartbeat from the third party device after the pairing with the third party device is established, in checking whether the pairing with the third party device is broken.

In yet another example embodiment, the electronic device is configured to request for a response from the third party device, in checking whether the pairing between the third party device and the electronic device is broken.

Some example embodiments are directed to methods of monitoring a pairing between an electronic device and a third party device. The method comprises establishing a pairing with the third party device through a short-range pairing mechanism, receiving information from the third party device via the short-range pairing mechanism, determining whether the pairing with the third party device is broken, and, in response to the determination that the pairing with the third party device is broken, transmitting information indicating the breakage of the pairing to a remote server.

In one example embodiment, the method further comprises wiping out an application on the electronic device upon a command issued by the remote server, after transmitting the information indicating the breakage of the pairing.

Some example embodiments are directed to a non-transitory computer-readable storage medium, having computer-executable instructions embodied thereon. Upon executed by one or more processors of an electronic device, the computer-executable instructions cause the one or more processors to establish a pairing with a third party device through a short-range pairing mechanism, to receive information from the third party device via the short-range pairing mechanism, to determine whether the pairing with the third party device is broken, and, in response to the determination that the pairing with the third party device is broken, to transmit information indicating the breakage of the pairing to a remote server.

In one example embodiment, the computer-executable instructions further cause the one or more processors to wipe out an application on the electronic device upon a command issued by the remote server.

The exemplary embodiments, aspects, and advantages disclosed herein may be provided in any suitable combination or sub-combination to achieve yet further exemplary embodiments.

BRIEF DESCRIPTION OF THE DRAWINGS

The accompanying drawings facilitate an understanding of the various preferred embodiments of this invention. In such drawings.

DETAILED DESCRIPTION OF EXEMPLARY EMBODIMENTS

In accordance with certain exemplary embodiments, certain systems, devices, processes and methods are disclosed for pairing two devices via a short range pairing mechanism, more particularly, certain exemplary embodiments relate to monitoring and alerting a pairing between two devices via a short range pairing mechanism are described herein. In the following description, for purpose of explanation, numerous specific details are set forth to provide a thorough understanding of the exemplary embodiments. It will be evident, however, to a person skilled in the art that the exemplary embodiments may be practiced without these specific details.

Figure 1:
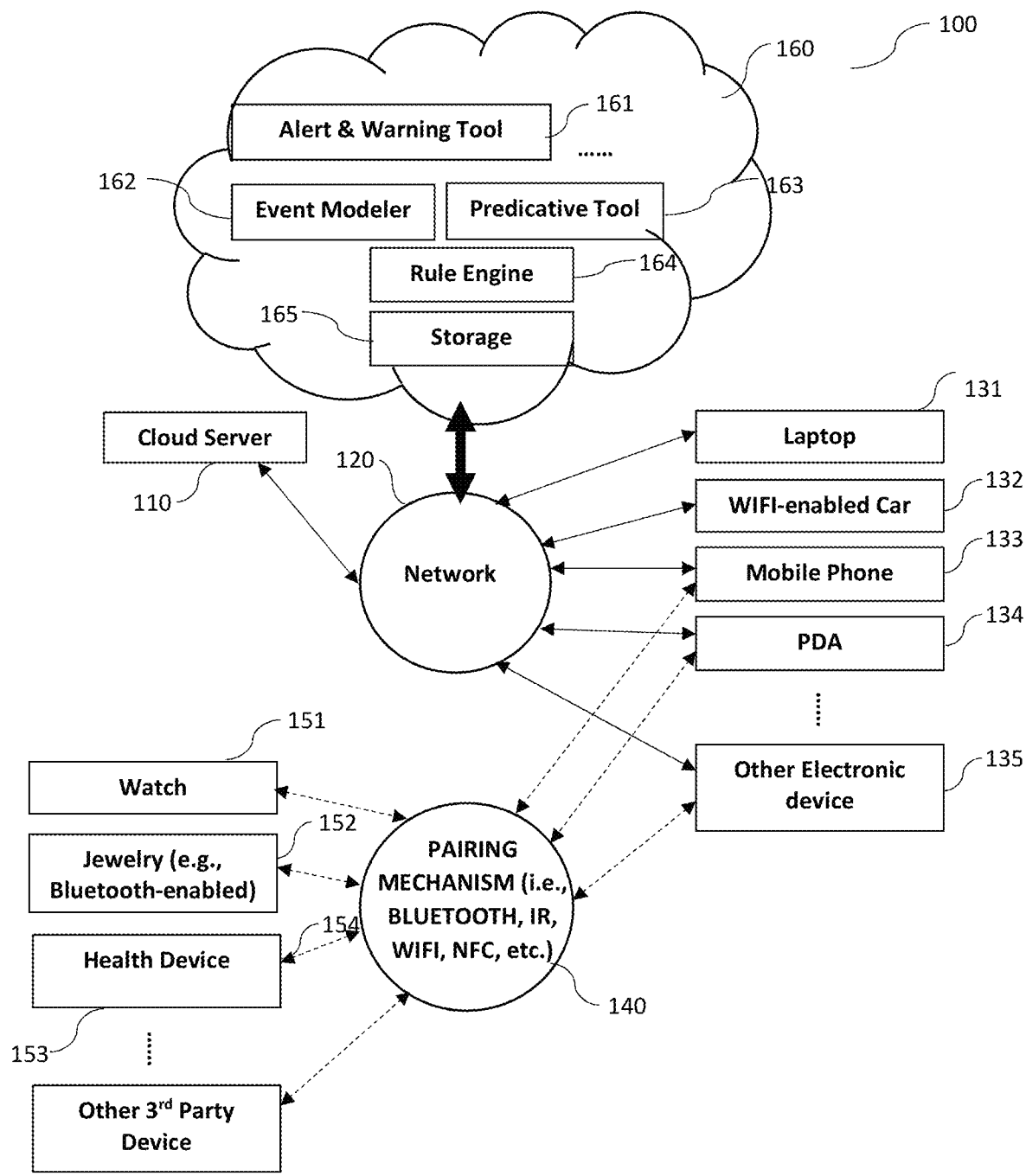
FIG. 1 shows a non-limiting, exemplary system architecture of an exemplary crowd-sourced cloud system with at least two paired devices.

FIG. 1 illustrates a no limiting, exemplary system architecture 100 of an exemplary crowd-sourced cloud system with at least two paired devices. Some example embodiments may have different and/or other sub-modules than the ones described herein. Similarly, the functions can be distributed among the sub-modules in accordance with other embodiments in a different manner than is described herein.

The system architecture 100 includes a cloud server 110 based on a cloud platform 160 and a network 120. The cloud platform 160 connects the cloud server 110 and a plurality of end point devices 131-135 via the network 120 to enable more robust data collection, data transmission, data analysis and decision-making. Examples of the network 120 may include a Local Area Network (LAN), a wide area network, or a global network, such as Internet, etc. The cloud server 110, in one example embodiment, may be combined with the cloud platform 160 as one component. In another example embodiment, the cloud server 110 may be located separately from the cloud platform 160.

In certain example embodiments, the end point devices 131-135 are, respectively, a laptop 131, a Wi-Fi-enabled car 132, a mobile phone 133, a PDA 134, and other electronic device 135, though it will be appreciated that other properly configured devices may be used. The end point devices 131-135 preferably allow users to effectively collect audio data, video data, still images and/or other data, and transmit the collected data to the cloud server 110. The images, audio and/or video data may be recorded by one of the end point devices regarding an event happening at the location of respective end point device.

Preferably, data (for example, textual, image, audio and/or visual data) collected and uploaded by one of the end point devices 131-135 may be received and reflected by another end point device. A user of the other end point device may monitor textual, images, audio and/or video data recorded by the end point device in real-time. For example, if a heat map (e.g., a general health and well-being of a population area) is shown on an end point device, a user of another end point device updates his/her personal health data to the cloud server 110, and then the heat map shown on the end point device will reflect that change, and/or an alert may be sent to the user. Moreover, additional RSS feed data, such as pollen count, heat index, health warning, may also be overlaid onto the heat map to create a holistic health snapshot informed by multiple sources.

The end point devices 131-135 may communicate with the cloud server 110 through the network 120. It will be appreciated that the end point devices 131-135 may communicate with the cloud server 110 via any suitable communications means, such as satellite communications, radio communications, telephone communications, cellular communications, internet communications, or other means capable of distributing data from the cloud server 110 or the cloud platform 160 to the end point devices 131-135 and enabling data to be uploaded from the end point devices 131-135 to the cloud server 110 or the cloud platform 160.

The cloud platform 160 comprises a storage 165 to store various intelligent data collected by sensors of the end point devices 131-135. Moreover, the cloud platform 160 comprises an event modeler 162 that performs event processing and analyzing to interpret and act on the collected data, a predicative tool 163 configured to predict a future event, like a potential problem or a dangerous situation, and an alert and warning tool 161 that generates alerts and warnings upon a predetermined event or scenario. A rule engine 164 can be provided to support the event modeler 162 and predicative tool 163. The rule engine 164 may analyze the collected intelligent data to predict future events, and/or derive analytics data, such as, but not limited to, the health situation of a population area.

By utilizing data received from sensors of end point devices and/or analytical data derived by the rule engine, various services may be provided by the crowd-sourced cloud system, including but not limited to, monitoring the location of a portable electronic device and/or a person associated with the portable electronic device, reviewing and analyzing image, audio and/or video data recorded by at least one end point device, providing a heat map of a particular population of area, and so on. Moreover, alerts or warnings may be generated based on the collected data and/or the generated analytic data., and then the generated alerts or warnings may be delivered to one or more end point devices. It is to be understood that the services supported by the cloud platform 160 are not to be limited to these disclosed services, but may include any kinds of other services powered by the cloud platform 160.

As shown in FIG. 1, one of the end point devices 131-135 may be paired with a third party device via a short-range pairing mechanism 140. Examples of the third party device may include a watch 151, jewelry 152 (e.g., Bluetooth-enabled jewelry), a health device 153 (e.g., Fitbit, or a heart rate band), other $3^{rd}$ party device 154, or the like. In alternative example embodiments, the third party device may be a mobile phone or a tablet.

The third party device may be a device or item operated by, associated with, attachable to or wearable by a user or any kind of portable items. Alternatively, the third party device may be any kind of device or item placed at a particular location or a movable vehicle. The third party device may either be associated with the user operating the electronic device to be paired with or another user who is in proximity of the user operating the paired electronic device. When the end point device and third party device are associated with two individuals in proximity to each other respectively, the end point device can detect the separation of these two individuals by detecting a status state of the pairing between the end point device and the third party device.

In certain example embodiments, the pairing mechanism 140 may be a pairing or communication channel using short-range communication technology, such as Bluetooth®, near field communication (NFC), infrared (IR), Zigbee, or Wi-Fi® direct, etc. That is, the pairing between one of the end point devices 131-135 and the third party devices 151-154 can be established via Bluetooth, IR, Wi-Fi direct, near field communication, Zigbee or other short-range communication technology.

After being paired with a third party device, an electronic device may periodically determine a status state of the pairing, and take appropriate actions upon determining that the pairing is broken, as detailed below with respect to FIGS. 7-9.

Figure 2:
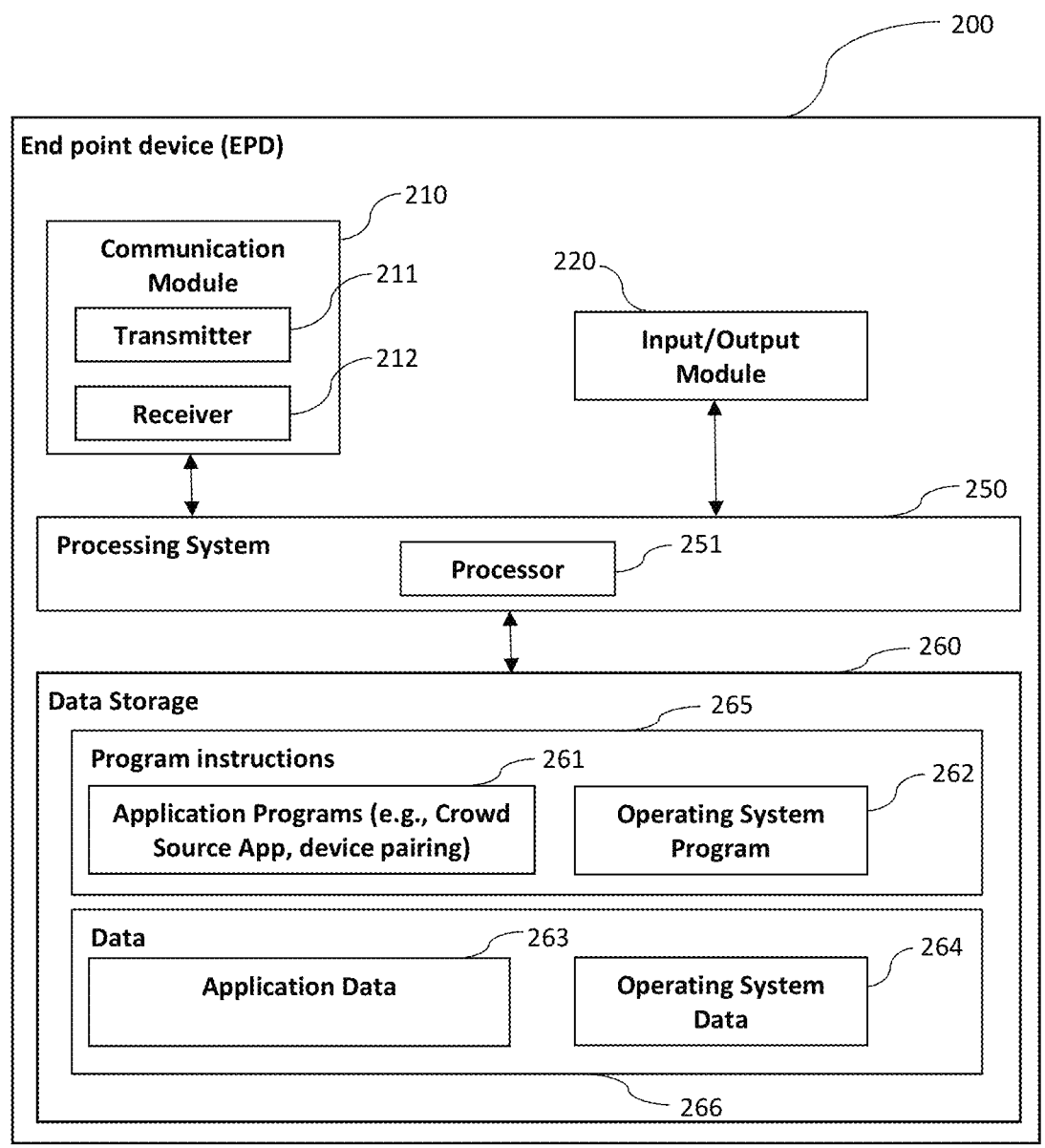
FIG. 2 shows a non-limiting, exemplary block diagram of an example end point device.

As discussed above in connection with FIG. 1, an end point device may be a laptop, a desktop, a mobile phone, a PDA, a tablet, a digital video recorder, or any other types of device equipped with one or more wireless and/or wired communication interfaces. FIG. 2 shows a non-limiting, exemplary block diagram of an example end point device 200. In this exemplary embodiment, the end point device 200 includes a communication module 210, an input/output module 220, a processing system 250 and a data storage 260, all of which may be communicatively linked together by a system bus, network, or other connection mechanisms.

The communication module 210 functions to allow the end point device 200 to communicate with one or more of the other end point devices 131-135, one or more of the third party devices 151-154, the cloud server 110, and/or the cloud platform 160, etc. The communication module 210 comprises a transmitter 211 configured to transmit data to other devices and a receiver 212 configured to receive data from other devices.

In certain example embodiments, the communication module 210 may comprise one or more communication interfaces supporting satellite communications, radio communications, telephone communications, cellular communications, internet communications, and/or the like. In other example embodiments, the communication module 210 may comprise a wireless transceiver with connected antenna, a wireless LAN module, a radio-frequency (RP), Infrared, or Bluetooth® transceiver, and/or a near field communication transceiver module. One or more of these communication components may collectively provide a communication mechanism by which the end point device 200 can communicate with other devices, platform and/or networks.

The data storage 260 may comprise one or more volatile and/or non-volatile storage components, such as, a hard disk, a magnetic disk, an optical disk, read only memory (ROM) and/or random access memory (RAM), and may include removable and/or non-removable components. The date storage 260 may be integrated in whole or in part with the processing system 250.

The processing system 250 may comprise one or more processors 251, including one or more general purpose processors and/or one or more special purpose processors (i.e., DSPs, GPUs, EPs car ASICs). The processing system 250 may be capable of executing application program instructions 265 (e.g., compiled or non-compiled program and/or machine code) stored in data storage 260 to perform the various functions and processes described herein. The data storage 260 may include non-transitory computer-readable medium, having stored thereon program instructions that, if executed by the end point device 200, cause the end point device 200 to perform any of the processes or functions disclosed herein and/or illustrated by the accompanying drawings.

In certain example embodiments, the program instructions 265 may include an operating system program 262 and one or more application programs 261, such as program instructions for a crowd-source application installed on the end point device 200. Further, the application programs 261 may communicate with the operating system program)62 via certain application programming interfaces.

During the execution of the program instructions 265, the processing system 250 may use data 266 including application data 263 and operating system data 264. In particular, the operating system data 264 may be accessed while the processing system 250 is executing the operating system program 262, and the application data 263 may be accessed while the processing system 250 is executing the application programs 261.

The input/output module 220 of the end point device 200 may function to allow the end point device 200 to interact with a human or non-human user, such as to receive input from a user and to provide output to the user. The input/output module 220 may include a touch-sensitive or presence-sensitive panel, keypad, keyboard, trackball, joystick, microphone, still camera and/or video camera, and the like. The input/output module 220 may also include one or more output components such as a display device, which may be combined with a touch-sensitive or presence-sensitive panel. Examples of the display device may include a cathode ray tube (CRT), a liquid crystal display (LCD), an electro luminescence (EL) display, a vacuum fluorescent display, a plasma display panel, a thin-film transistor (TFT) LCD, an organic light-emitting display device, an electrophoretic display, and the like. In an example embodiment, the input/output module 220 may display various user interfaces to enable a user to access services or functions provided by the end point device 200. The input/output module 220 may also be configured to generate audible output, via a speaker, audio output port, audio output device, earphones, and/or other similar devices.

Figure 3:
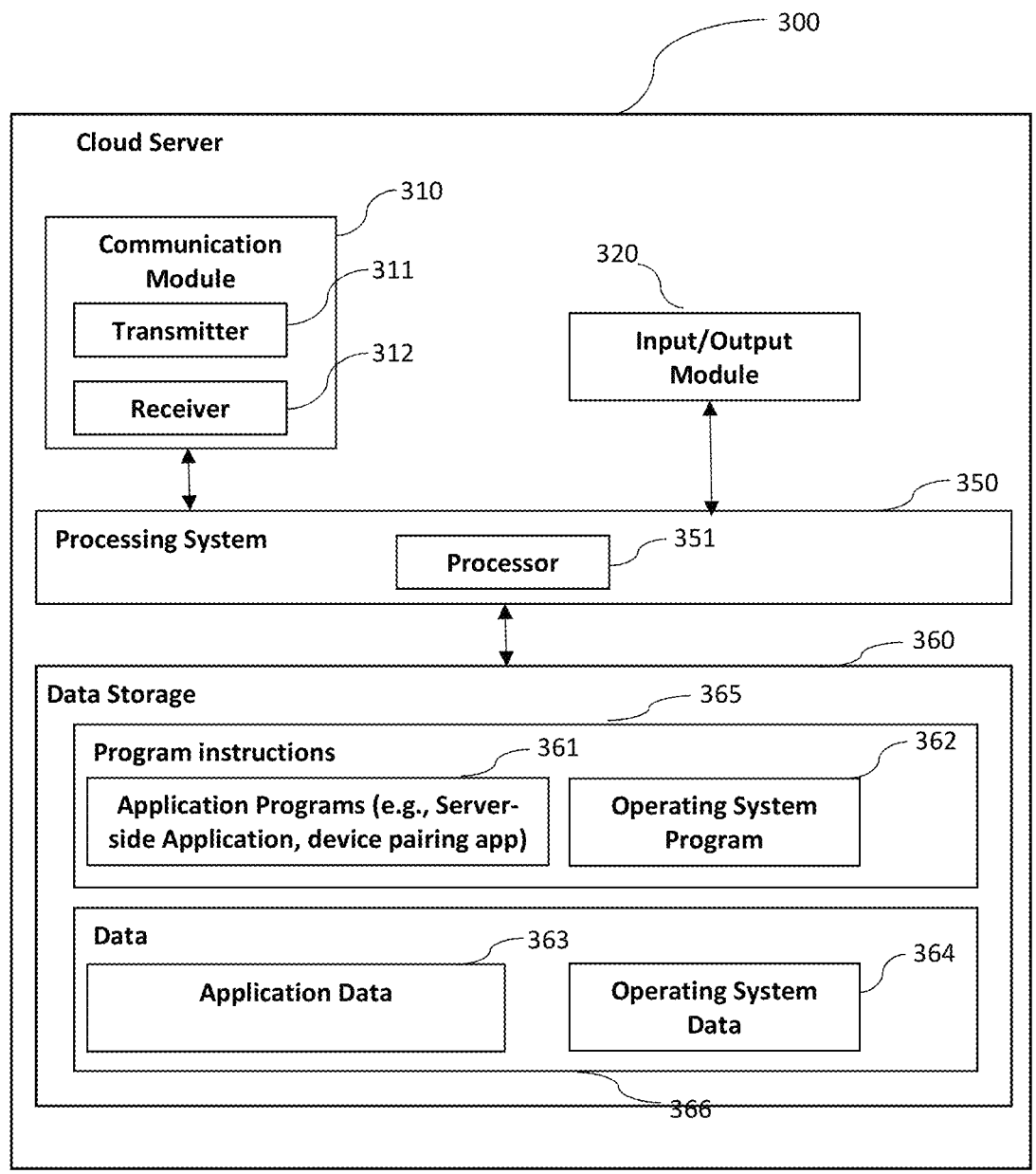
FIG. 3 shows a non-limiting, exemplary block diagram of an example cloud server.

FIG. 3 shows a non-limiting, exemplary block diagram of an example cloud server 300. In this exemplary embodiment, the cloud server 300 includes a communication module 310, an input/output module 320, a processing system 350 and a data storage 360, all of which may be communicatively linked together by a system bus, network, or other connection mechanisms.

The communication module 310 functions to allow the cloud server 300 to communicate with one or more of the end point devices 131-135, or other electronic devices. The communication module 310 comprises a transmitter 311 configured to transmit data to other devices and a receiver 312 configured to receive data from other devices. In certain example embodiments, the communication module 210 may comprise one or more communication interfaces supporting satellite communications, radio communications, telephone communications, cellular communications, internet communications, and/or the like. One or more of these communication components may collectively provide a communication mechanism by which the cloud server 300 can communicate with other devices, platform and/or networks.

The data storage 360 may comprise one or more volatile and/or non-volatile storage components, such as, a hard disk, a magnetic disk, an optical disk, read only memory (ROM) and/or random access memory (RAM), and may include removable and/or non-removable components. The date storage 360 may be integrated in whole or in part with the processing system 350.

The processing system 350 may comprise one or more processors 351, including one or more general purpose processors and/or one or more special purpose processors (i.e., DSPs, GPUs, FPs or ASICs). The processing system 350 may be capable of executing application program instructions 365 (e.g., compiled or non-compiled program and/or machine code) stored in data storage 360 to perform certain functions and processes described herein. The data storage 360 may include non-transitory computer-readable medium, having stored thereon program instructions that, if executed by the cloud server 300, cause the cloud server 300 to perform any of the processes or functions disclosed herein and/or illustrated by the accompanying drawings.

In certain example embodiments, the program instructions 365 may include an operating system program 362 and one or more application programs 361, such as program instructions for a crowd-source application installed on the cloud server 300. Further, the application programs 361 may communicate with the operating system program 362 via certain application programming interfaces.

During the execution of the program instructions 365, the processing system 350 may use data 366 including application data 363 and operating system data 364. In particular, the operating system data 364 may be accessed while the processing system 350 is executing the operating system program 362, and the application data 363 may be accessed while the processing system 350 is executing the application programs 361.

The input/output module 320 of the cloud server 300 may function to allow the cloud server 300 to interact with a human or non-human user, such as to receive input from a user and to provide output to the user. The input/output module 320 may include a touch-sensitive or presence-sensitive panel, keypad, keyboard, trackball, joystick, microphone, still camera and/or video camera, and the like. The input/output module 320 may also include one or more output components such as a display device, which may be combined with a touch-sensitive or presence-sensitive panel. Examples of the display device may include a cathode ray tube (CRT), a liquid crystal display (LCD), an electro luminescence (EL) display, a vacuum fluorescent display, a plasma display panel, a thin-film transistor (TFT) LCD, an organic light-emitting display device, an electrophoretic display, or the like. In an example embodiment, the input/output module 320 may display various user interfaces for services or functions provided by the cloud server 300. The input/output module 320 may also be configured to generate audible output, via a speaker, audio output port, audio output device, earphones, and/or other similar devices.

Figure 4:
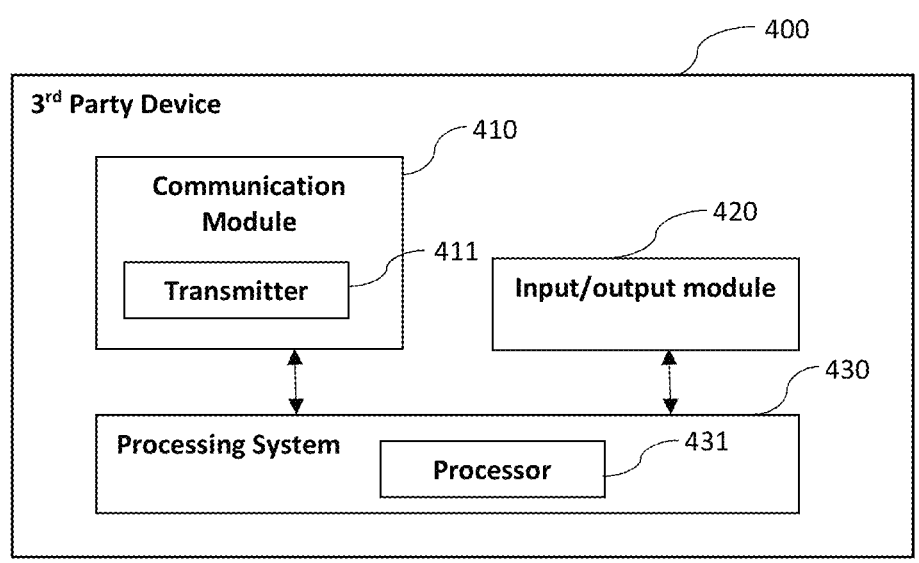
FIG. 4 shows a non-limiting, exemplary block diagram of an example third party device.

Referring now to FIG. 4, it shows a non-limiting, exemplary block diagram of an example third party device 400. The third party device 400 comprises a communication module 410, a processing system 430 and an input/output interface 420.

The communication module 410 comprises at least a transmitter 411, which can output a wireless transmission, for example, directed to an end point device. The transmitter 411 may be a wireless transceiver with connected antenna, a wireless LAN module, a radio-frequency (RF), Infrared, or Bluetooth® transceiver, and/or a near field communication transceiver module.

In some example embodiments, the communication is uni-directional—from the third party device 400 to an end point device. However, in other example embodiments, the communication module 410 may also comprise a receiver to receive data from other devices, and the communication could be bi-directional—between the third party device 400 and the end point device.

The processing system 430 may comprise one or more processors 431, including one or more general purpose processors and/or one or more special purpose processors (i.e., DSPs or ASICs). The processing system 430 may be capable of executing application program instructions to perform certain functions and processes described herein. The processing system 450 may be capable of executing application program instructions (e.g., compiled or non-compiled program and/or machine code) stored in a data storage to perform certain functions and processes described herein. The data storage may include non-transitory computer-readable medium, having stored thereon program instructions that, if executed by the third party device 400, cause the third party device 400 to perform any of the processes or functions disclosed herein and/or illustrated by the accompanying drawings.

The input/output module 420 may function to allow the third party device 400 to interact with a human or non-human user, such as to receive input from a user and to provide output to the user. The input/output module 420 may include a touch-sensitive or presence-sensitive panel, keypad, keyboard, trackball, joystick, microphone, still camera and/or video camera, and the like. The input/output module 420 may also include one or more output components such as a display screen, which may be combined with a touch-sensitive or presence-sensitive panel, or any other kinds of displays. The input/output module 420 may also be configured to generate audible output, via a speaker, audio output port, audio output device, earphones, and/or other similar devices.

It will be appreciated the third party device could be any other kinds of device or item supporting one or more the above disclosed short-range communication schemes. For example, a third party device may simply be an item with a passive RFID tag consisting only of an IC and internal antenna, with or without an internal power source.

Figure 5:
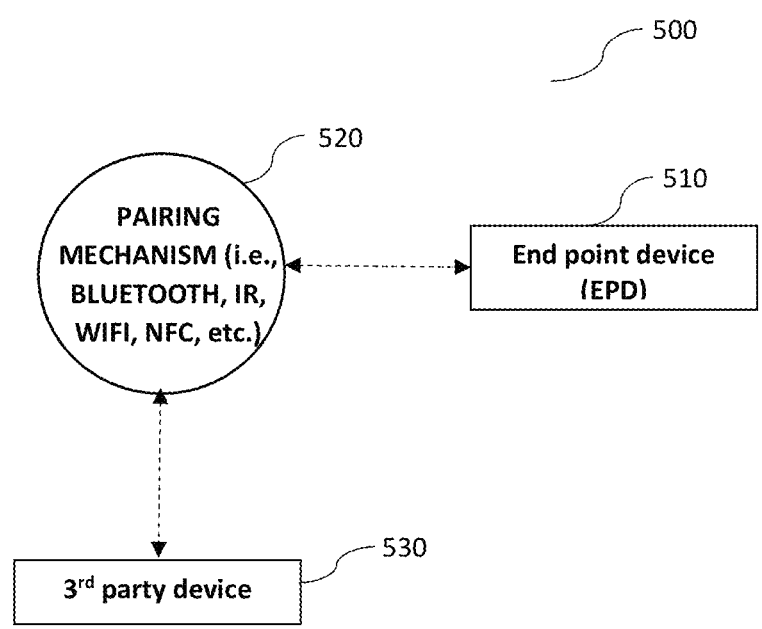
FIG. 5 shows a non-limiting, exemplary pairing between an end point device and a third party device.

FIG. 5 shows a non-limiting, exemplary pairing between an end point device 510 and a third party device 530. In FIG. 5, via a pairing mechanism 520, the end point device 510 may be communicatively tethered to the third party device 530 and receive data or signals from the third party device 530. In an example embodiment, the pairing mechanism 520 involves two devices being placed in proximity to each other and communicating over a pairing or communication mechanism using short-range communication technology, such as, Bluetooth®, infrared (IR), near field communication (NFC), 802.11 family of standards (Wi-Fi®), or the like.

In an example embodiment, the end point device 510 may establish a pairing with the third party device 530 via Bluetooth communication technology, which is a protocol standard for short-range wireless connectivity. Bluetooth communication technology may connect diverse types of devices, such as cellular phones, headsets, keyboard, speakers, thermostats and security systems, and the like. Bluetooth communication technology uses the free and globally available unlicensed Industrial, Scientific and Medical (ISM) 2.4 GHz radio band, for example, allowing two devices within a range of up to about 10 to 100 meters to share data with throughput up to about 2.1 Mbps. Bluetooth provides a manner in which many devices may communicate with one another, without connectors, wires or cables.

In other example embodiments, the end point device 510 and the third party device 530 may be paired through NFC peer-to-peer communication. NFC is a set of short-range wireless technologies, for example, requiring a separation of 10 cm or less. In certain example embodiments, NFC operates at 13.56 MHz on ISO/IEC 18000-3 air interface and at rates ranging from 106 kbit/s to 424 kbit/s. NFC tags may offer between 96 and 4,096 bytes of memory. NFC tags contain data and are typically read-only, but may be writeable. The tags can securely store personal data such as PINs and networking contacts, among other information.

NFC peer-to-peer communication may involve an initiator and a target, and the initiator actively generates an RF field that can power a passive target. This enables NFC targets to take very simple form factors such as unpowered tags, stickers, key fobs, or cards. As a result, a third party device to be paired with an end point device may be an item having a unpowered tag, as the tag of the third party device may be powered by an RF field generated by the end point device. In this way, the end point device may establish a pairing with the third party device.

NFC communication between two devices may also be achieved through other alternative means, such as ultrasonic communication, etc. For example, ultrasonic communication allow two mobile phones to exchange information via inaudible sound waves (i.e. ultrasound). That is, when two devices are close enough to each other, information may be exchanged between two devices via sound waves that is inaudible to a suspect under investigation.

Two devices may also be paired via Wi-Fi Direct, initially called Wi-Fi P2P. Wi-Fi Direct is a Wi-Fi standard enabling devices to establish a direct Wi-Fi connection without requiring a wireless access point, e.g., a wireless router. As such, two devices may connects to each other via Wi-Fi in ad-hoc mode without going through Internet.

In another example, two devices may be paired via determining whether these two devices can receive similar radio or sound signals, as similar signals should always be received by the devices at the same location or environment. It will be appreciated that other appropriate short-range communication technology may be used to pair the end point device with the third party device.

Figure 6:
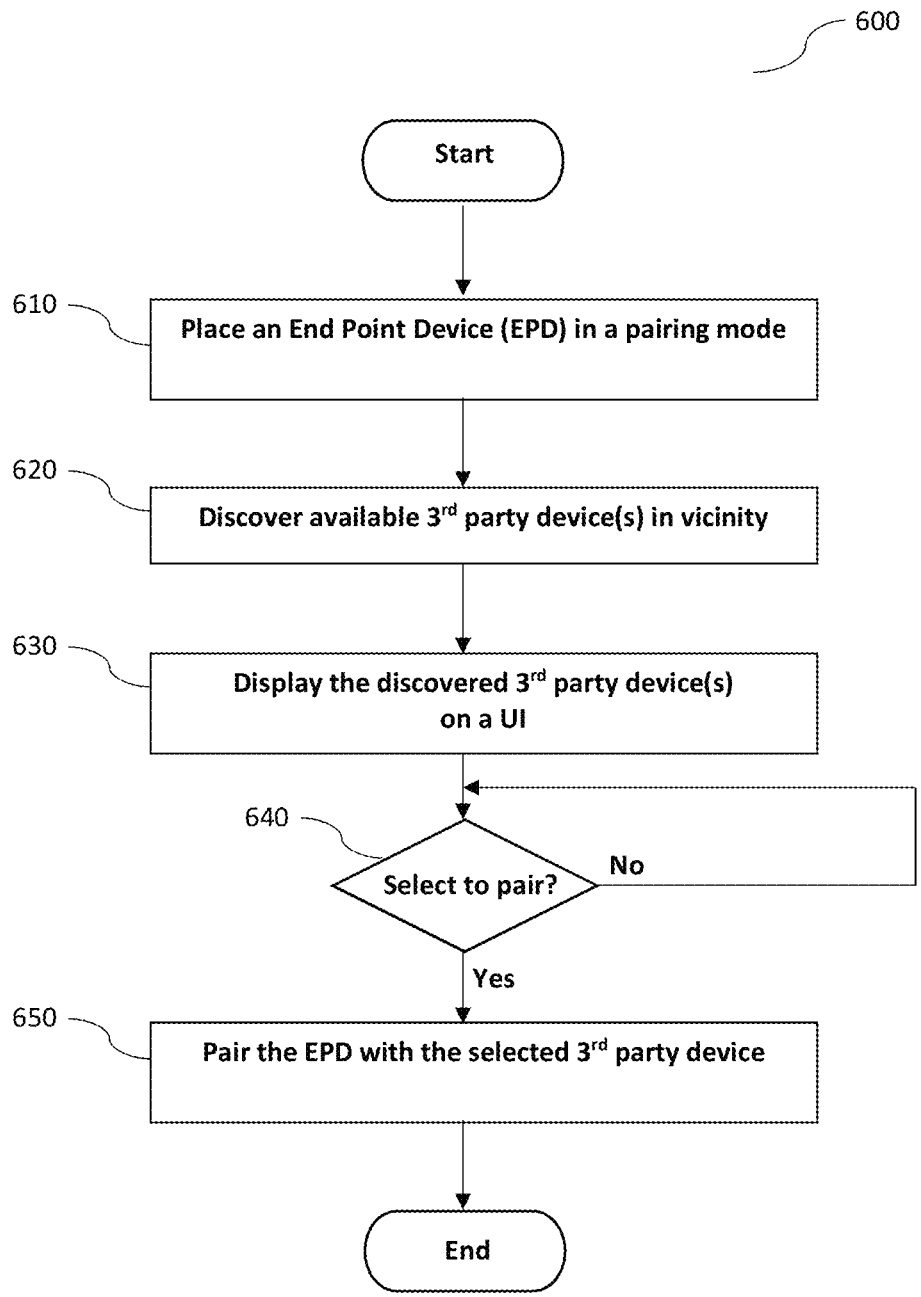
FIG. 6 shows a non-limiting, exemplary workflow diagram for an example pairing initiation process between an end point device and a third party device.

FIG. 6 shows a non-limiting exemplary workflow diagram for an example pairing initiation process 600 between an end point device and a third party device. For example, the pairing initiation process 600 is performed by the end point device 510 and the third party device 530 in FIG. 5. In an example embodiment, the third party device 530 may be associated with, attachable to or wearable by an individual who is operating the end point device. In other example embodiments, the end point device 510 and the third party device 530 may be operated by two individuals that are close to each other. In yet another example embodiment, one of the third party device 530 and the end point device 510 may be placed at a particular location or a movable vehicle.

At step 610, the pairing initiation process 600 initially receive a command, for example, from a user of the end point device or a remote cloud-based server, to place the end point device 510 to be paired in a pairing mode. In an example embodiment, the user of the end point device 510 may issue the command to request the pairing between the end point device 510 and the third party device 530 via a user interface of the end point device.

Once the end point device 510 is placed in the pairing mode, available third party devices in the proximity of the end point device 510 are discovered at step 620. At step 630, the discovered available third party devices are displayed on a user interface of the end point device 510. In an example embodiment, the user interface is updated as each new available third party device is discovered.

Displaying the discovered third party devices on the user interface allows the user of the end point device 510 to select one of the available third party devices to be paired with. A decision 640 determines whether a user selection of one of the discovered available third party devices has been made. If the user has not yet selected one of the displayed third party devices, then the pairing initiation process 600 waits for the user's decision. If the user has selected one of the displayed third party devices to be paired with, the end point device 510 is paired with the selected third party device at step 650. After that, the end point device 510 communicate with the third party device 530 using, for example, characteristic read/write/notify requests and responses. Depending on the usage scenario, the end point device 510 may handle only signals from the third party device, without initiating any direct connections to the third party device.

Figure 7:
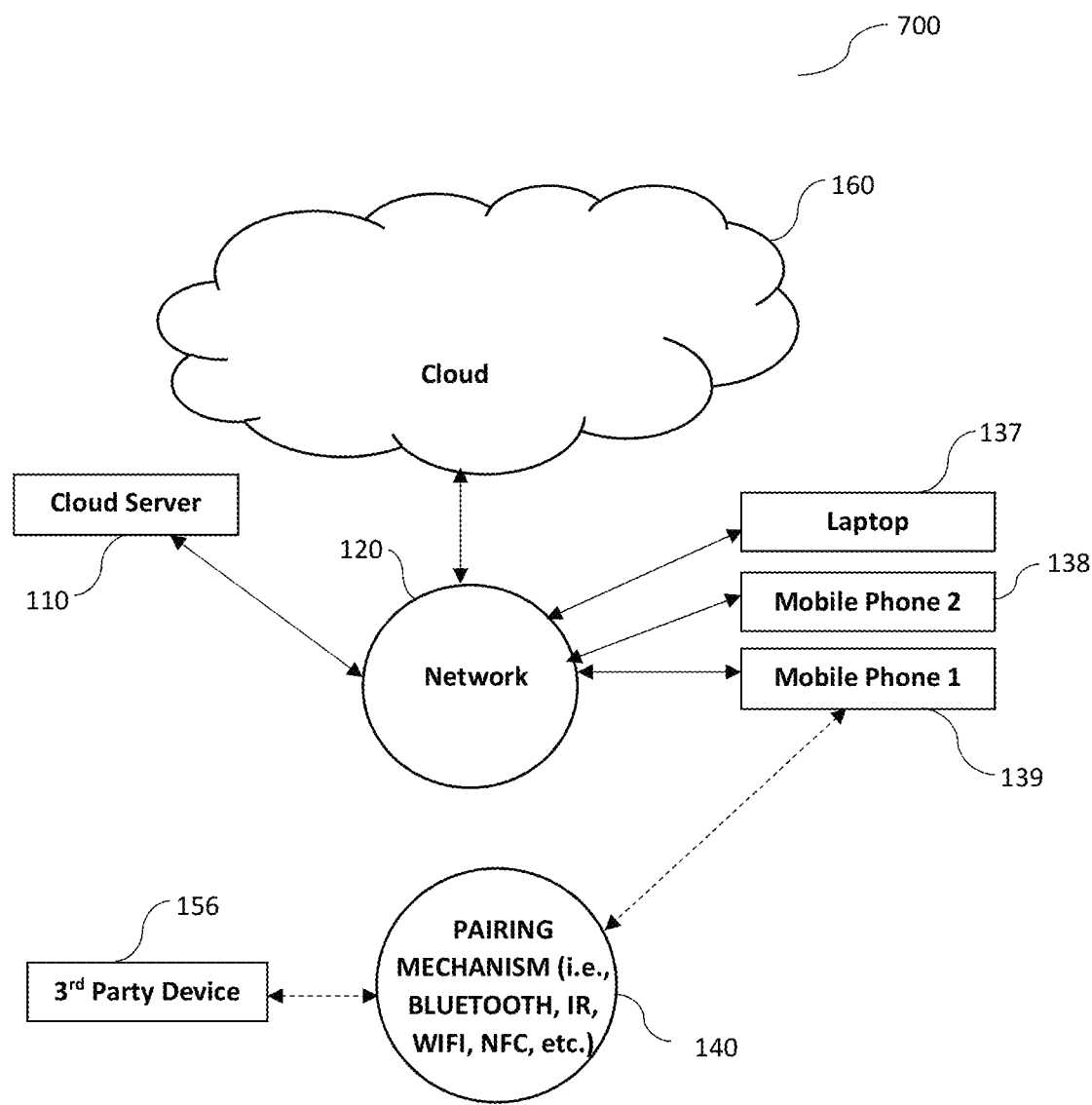
FIG. 7 shows a non-limiting, exemplary working scenario of monitoring and alerting the breakage of a pairing between an end point device and another third party device.

FIG. 7 illustrates a non-limiting exemplary working scenario 700 of monitoring and alerting the breakage of a pairing between an end point device and a third party device. One of end point devices (e.g., a mobile phone 137, an iPad 138, and a laptop 139) establishes a pairing with a third party device 156 via a short range pairing mechanism 140. The end point devices 137-139, as a part of a crowd sourced cloud system, collect intelligent data and transmit the collected data to the remote cloud server 110. In an example embodiment, the third party device 156 may be associated with, attachable to or wearable by an individual who is operating the end point device 137, 138 or 139. In other example embodiments, the end point device 510 and the third party device 530 may be operated by two individuals that are close to each other, or one of these two devices is placed at a particular location or a movable vehicle.

A message will be automatically transmitted to the cloud server 110 via the network 120, when one of the end point devices 137, 138 and 139 is no longer paired with the third party device 156, for example, it is separated from the third party device 156 more than a predetermined distance. In an example embodiment, the message may be sent via the network 120 to inform the cloud server 110 that one of the end point devices is separated from its paired third party device more than the predetermined distance. In certain example embodiments, the message sent to the cloud server 110 may also include information identifying the detected location of respective end point device.

In an illustrative, non-limiting example, as shown in FIG. 7, when the mobile phone 139 is separated from the third party device 156 more than the predetermined distance, the mobile phone 139 detects the breakage of the pairing with the third party device 156. In embodiments, the mobile phone 139 may monitor the breakage of the pairing through detecting shutting off the Blue Tooth or other signal on the third party device 156, or activating a pre-built button on the third party device 156 and interpreting that action as a panic or duress call on the App and/or server. After that, the mobile phone 139 first sends a message informing its separation from the third party device 156 to the cloud server 110 via the network 120. Upon receipt of the message from the mobile phone 139, the cloud server 110 sends another message indicating the separation to the laptop 137 and/or to the iPad 138 via the network 120.

In certain example embodiments, the other end point devices (e.g., the laptop 137 or iPad 138) receiving the alerts from the cloud server 110 may be associated with a law enforcement agency facility, a law enforcement vehicle, an emergency response vehicle, or an emergency care facility, etc. The server may send a message to notify a law enforcement officer of the dangerous situation of an investigator or issue a command to an emergency response team to request it to take appropriate actions to rescue the investigator.

In an example embodiment, upon receipt of the message from the mobile phone 139, the cloud server 110 may issue a command to the mobile phone 139 to wipe out its crowd sourced application. In this way, when an end point device associated with an investigator is seized, it would no longer have the crowd sourced application installed. As such, the suspect could not tell that she/he was secretly recorded. Moreover, the remote server may also guide the electronic device to take actions based on information collected from other sources and/or data stored in the cloud platform 160.

Figure 8:
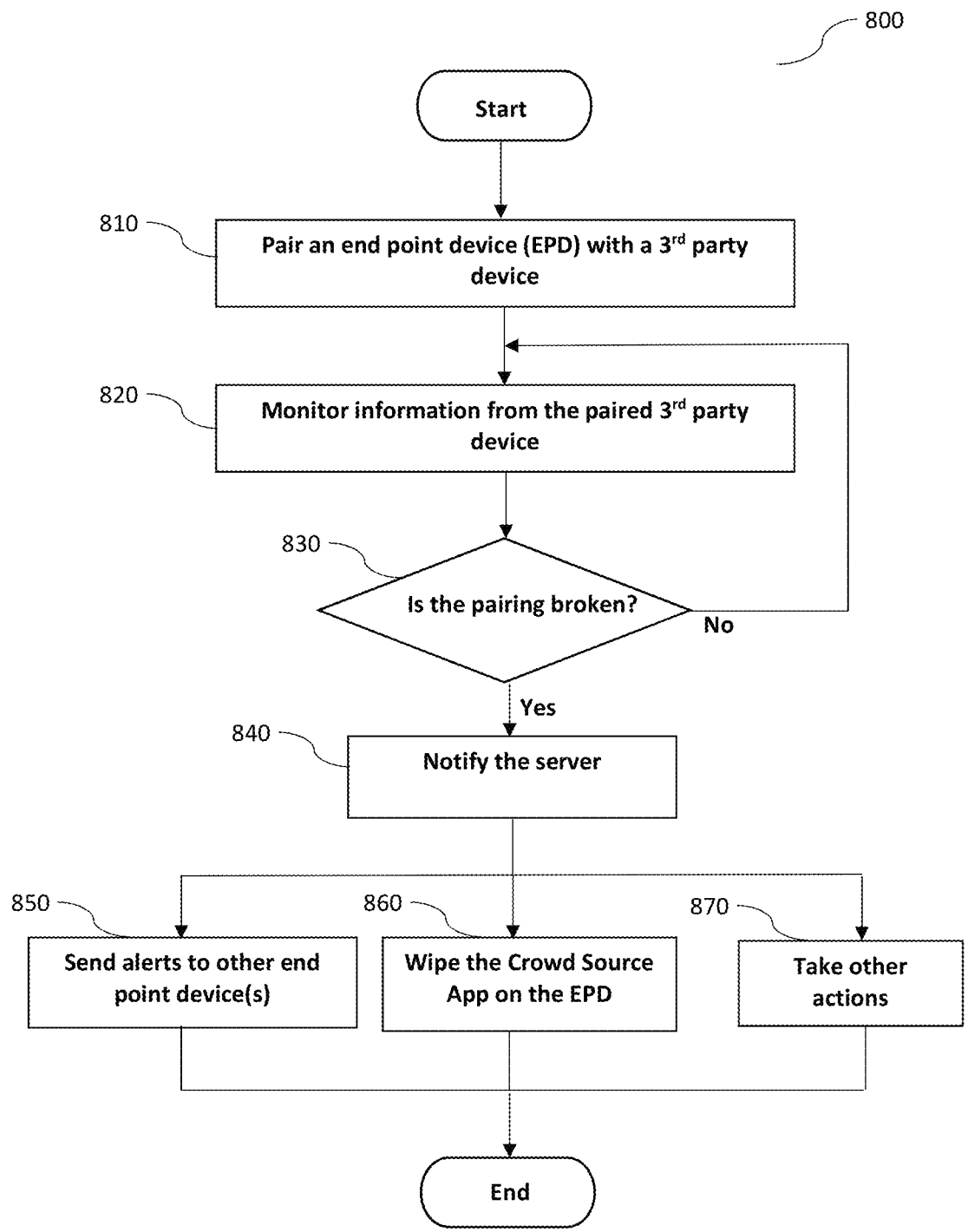
FIG. 8 shows a non-limiting, exemplary workflow diagram for an exemplary monitoring and alerting process for a pairing between an end point device and another third party device.

FIG. 8 illustrates a non-limiting exemplary workflow diagram for an exemplary monitoring and alerting process 800 for a pairing between an end point device and another third party device. For example, the monitoring and alerting process 800 is performed by the end point device 510 and the third party device 530 in FIG. 5. In an example embodiment, the third party device 530 may be associated with, attachable to or wearable by an individual who is operating the end point device. Alternatively, the end point device 510 and the third party device 530 may be operated by two individuals that are close to each other, or one of these two devices is placed at a particular location or a movable vehicle.

At step 810, the monitoring and alerting process 800 initially pairs the end point device 510 with the third party device 530, for example, the end point device 510 initiates a pairing with the third party device 530 through the pairing initiation process 600 as detailed in FIG. 6.

Once the pairing is established, the end point device 510 starts to receive signals or information from the paired third party device 530. Alternatively, the third party device 530 may receive signals or data from the paired end point device. In certain example embodiments, the end. point device 510 and third party device may exchange signals with each other.

In certain example embodiments, at step 820, in monitoring the breakage of its pairing with the other device, the end point device 510 may periodically attempt to detect a signal from the third party device 530. For example, the end point device 510 may monitor the breakage of the pairing through detecting a change in distance, shutting off the Blue Tooth or other signal on the third party device 530. Examples of the signal to be detected may include a heartbeat from the third party device 530, an answer or response from the third party device 530 upon the end point device 510's request, or a signal from the third party device 530 triggered by an RF wave, etc. In embodiments, the breakage of the pairing may also be detected through activating a pre-built button on the third party device 530 and interpreting that action as a panic or duress call on the App and/or server. In another example embodiment, the third party device 530 may periodically attempt to detect a signal from the paired electronic device in determining the status of their pairing. In yet another example embodiment, a remote device/server may determine the status of their pairing through communicating with both the end point device 510 and the third party device 530.

A decision 830 determines whether the pairing between the end point device 510 and the third party device 530 is broken. In an example embodiment, if the number of times that the signal was undetected exceeds a threshold, then the end point device 510 or the third party device 530 may determine that the pairing is broken. In alternative example embodiments, the breakage of the pairing between the end point device 510 and the third party device 530 may be detected by a remote device/server through receiving signals/information from both two devices.

If it is determined that the pairing is not broken, the end point device 510, the third party device 530, or both may continue to monitor signals from the other device to determine whether the pairing is broken at step 820.

Upon detecting that the pairing is broken, the end point device 510, the third party device, or both may take an appropriate action, such as informing a remote server (e.g., the cloud server 110) at step 840. In alternative example embodiments, the end point device 510 may send messages or commands to other electronic devices directly.

In an example embodiment, upon receipt the notification of the breakage of the pairing, the server may send messages to other end point devices at step 850 to notify the other devices and/or issue commands to the other electronic devices. As such, the other electronic devices or persons may take appropriate actions or act in accordance with commands issued by the remote server. In certain embodiments, the server may send a message to notify a law enforcement officer of the dangerous situation of an investigator or request an emergency response team to take appropriate actions to rescue the investigator.

Moreover, the server may issue a command to the end point device 510 to request for appropriate actions, such as wiping out a crowd sourced application installed on it at step 860, or taking other appropriate actions at step 870. For example, the server may request the end point device 510 to take actions based on information gathered from other devices.

Alternatively, the end point device 510 may perform these actions directly. For example, upon detecting that the pairing with the third party device 530 is broken, the end point device 510 may send messages or commands to other end point devices directly, or wipe out its crowd sourced application directly.

Figure 9:
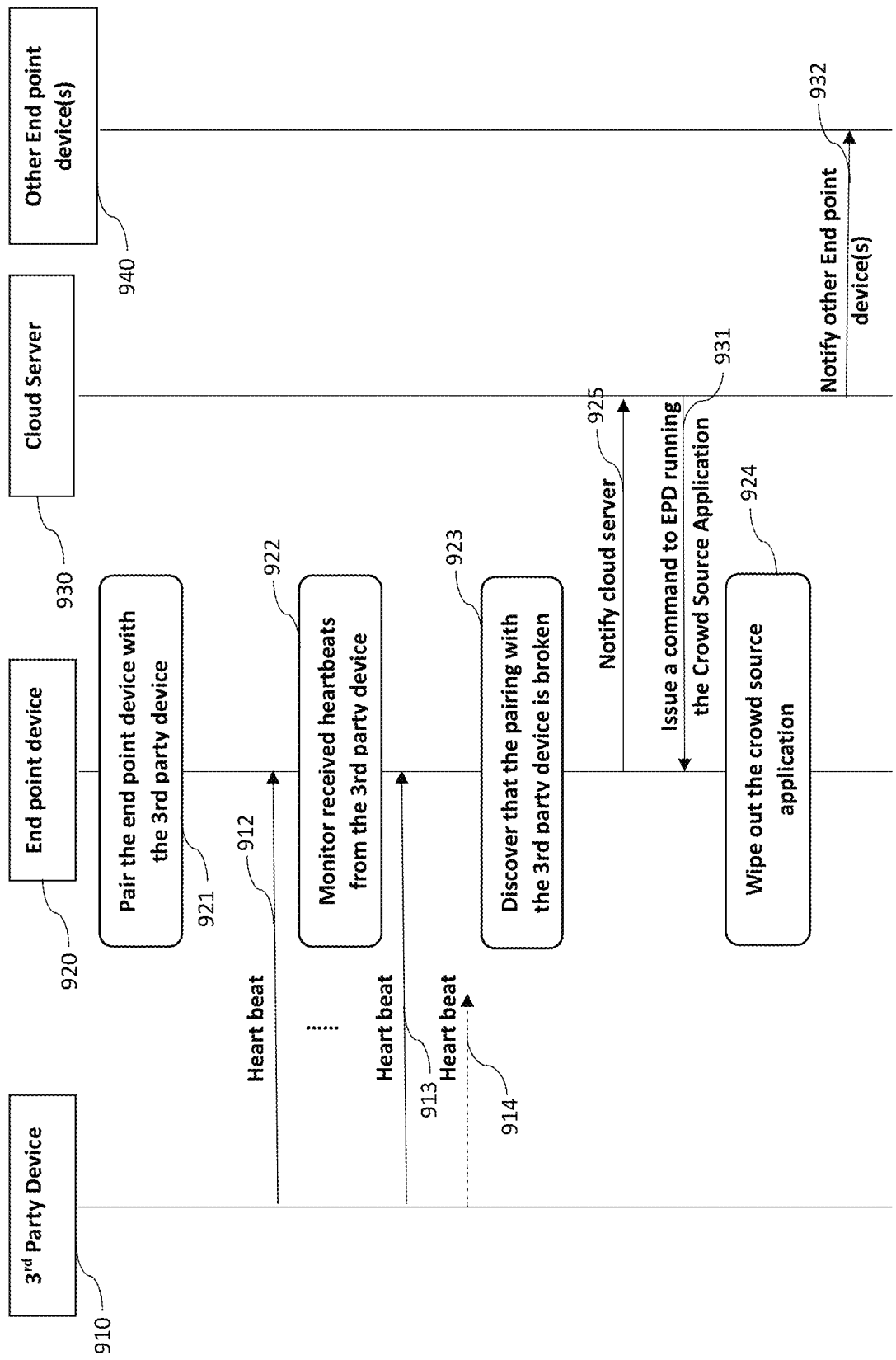
FIG. 9 shows a non-limiting, exemplary message flow chart for monitoring and alerting the breakage of the pairing between an end point device and a third party device.

FIG. 9 illustrates a non-limiting, exemplary message flow chart for monitoring and alerting the breakage of the pairing between an end point device 920 and a third party device 910. In FIG. 9, end point devices (e.g., 920 and 940) are in communication with a cloud server 930. At step 921, the end point device 920 may initiate a pairing with the third party device 910.

At steps 912 and 913, the third party device 910 may send heartbeats to the end point device 920 periodically. At step 922, the end point device 920 monitors the heartbeats transmitted from the third party device 910 to determine whether the pairing with the third party device 910 is broken. In this embodiment, the communication is unidirectional—from the third party device 910 to the end point device 920. However, in other embodiments, the communication could be bi-directional—between the third party device 910 and the end point device 920.

Some heartbeats from the third party device 910 may not be delivered successfully to the end point device 920. For example, when the end point device 920 is separated more than a predetermined distance from the third party device, the third party device 910 may not be able to successfully deliver heartbeats to the end point device 920. As indicated in FIG. 9, a heartbeat is not successfully transferred from the third party device 910 to the end point device 920 at step 914.

At step 923, the end point device 920 discovers that the pairing with the third party device 910 is broken, for example, when heart beats are not received from the third party device within a predetermined time period. In an example embodiment, upon discovering that the pairing with the third party device is broken, the end point device 920 may notify the cloud server 930 at step 925. After receiving the notification that the pairing between the end point device 920 and the third party 910 is broken, at step 931, the cloud server 930 may issue a command to the end point device 920 running a Crowd Source Application, for example, to request the end point device 920 to wipe out a crowd sourced application installed on it. Upon receipt the command from the cloud server 930, the end point device 920 may wipe out its crowd sourced application at step 924.

In certain example embodiments, at step 932, the cloud server 930 may send one or more messages or commands to other end point device(s) 940 to notify the other end point device(s) of the breakage of the pairing between the end point device 920 and the third party device 910, and/or request the other end point devices to take certain actions.

Figure 10:
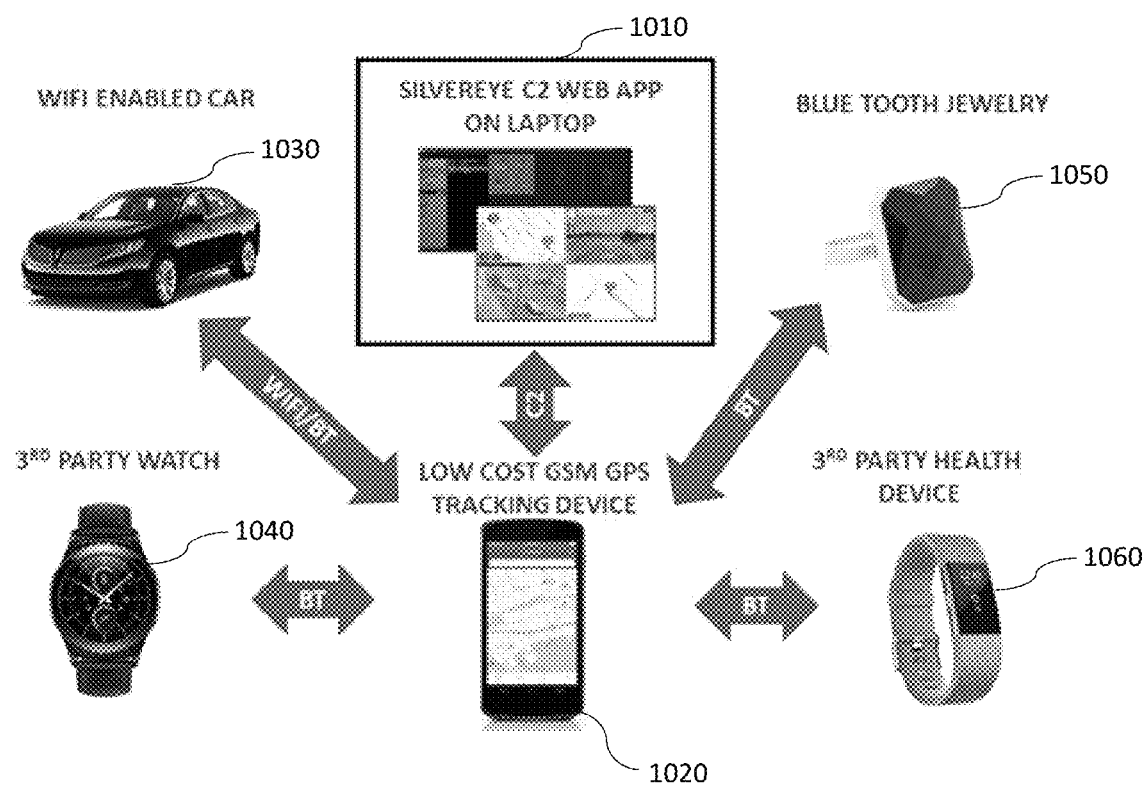
FIG. 10 shows non-limiting, exemplary use cases of wireless device pairing.

FIG. 10 illustrates non-limiting, exemplary use cases of wireless device pairing. In an example embodiment, a low-cost GSM GPS tracking device 1020 is provided to collect data and transmit the collected data to a server. The collected data may be location information of the tracking device 1020 collected by a GPS device, and/or image, audio or video data collected by sensors of the tracking device 1020. In other example embodiments, the collected data may be any other kinds of data collected or generated by the tracking device 1020.

In certain example embodiments, the data collected by the tracking device 1020 may be reflected on a laptop via a web application 1010, such as Silvereye C2 web application. Through the web application 1010, a user may monitor images, audio and/or video data recorded by the tracking device 1020 in real-time. The images, audio and/or video data may be recorded regarding an event happening at the location of the tracking device 1020.

In other example embodiments, the data collected by the tracking device 1020 may be uploaded to a cloud-based server, and then analytic data may be generated based on the collected data. The analytic data may be accumulated location information of multiple devices, the health situation of a predetermined population area, the security situation of one or more persons, or the like. Moreover, alerts or warnings may be generated based on the collected data and/or the analytic data, and then the generated alerts or warnings may be delivered to one or more other end point devices.

In certain example embodiments, the tracking device 1020 may establish a pairing with a third party device of any kind via a short-range pairing mechanism. As shown in FIG. 10, the third party device may be a WIFI-enabled car 1030, a third party watch 1040, a Bluetooth jewelry 1050, a third party health device 1060, or the like.

Upon establishing the pairing with one of the third party device 1030-1060, the tracking device 1020 starts to monitor the pairing and determine whether the pairing is broken. In an example embodiment, when the tracking device 1020 is separated more than a predetermined distance from the third party device, the tracking device 1020 can no longer receive any signals or data from the third party device. Accordingly, the tracking device 1020 may determine that the pairing is broken when no signals or data can be received from the third party device for a predetermined time period, or when the third party device does not respond to it any more.

In an example embodiment, the tracking device 1020 automatically activates the transmission of a notification to another device or the cloud server when the tracking device 1020 is separated more than a predetermined distance from the third party device. Initially, both the tracking device 1020 and the third party device may be associated with an individual who may potentially be in danger. It is desirable for the tracking device 1020 to transmit the notification immediately and automatically in the case of an emergency situation, such as the removal of the tracking device 1020 or the third party device from the individual in an abduction situation, and so on.

In other example embodiments, the tracking device 1020 transmits a notification to the cloud server and then the cloud server sends an alert or a command to another electronic device to notify another person of the breakage of the pairing. As such, the other people may take appropriate actions in response to the breakage of the pairing. In yet another example embodiment, the server may issue a command to the other electronic device to specifically request for appropriate actions to be performed by the other electronic device.

In the above-disclosed example embodiments, the end point device and third party device may be any kind of device or item supporting any kind of short-range communication scheme, and the activities or functions performed by the end point device and the third party device are interchangeable with each other.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A watch to be paired with a portable electronic device via short-range communication, comprising:
   a communication circuitry configured to enable short-range communication between the watch and the portable electronic device; and
   a processing system including a processor, the processing system being configured to:
      establish a pairing with the portable electronic device through a short-range pairing mechanism,
      receive, from a user of the watch, an alerting input indicating possible breakage of the pairing with the portable electronic device, and
      upon receipt of the alerting input from the user, transmit information indicating the possible breakage of the pairing to the server directly, or via the portable electronic device prior to breakage of the pairing with the portable electronic device.

2. The watch according to claim 1, wherein the processing system of the watch is further configured to transmit the information indicating the possible breakage of the pairing to the portable electronic device via short-range communication to have the portable electronic device transfer the information to the server.

3. The watch according to claim 1, wherein the processing system of the watch is configured to periodically detect a signal from the portable electronic device after the pairing with the portable electronic device is established.

4. The watch according to claim 1, wherein, upon receipt of the information indicating the possible breakage of the pairing between the watch and the portable electronic device, the server sends a message to another electronic device.

5. The watch according to claim 4, wherein the message sent to one or more other electronic devices by the server indicates the possible breakage of the pairing between the watch and the portable electronic device.

6. The watch according to claim 1, wherein, upon receipt of the information indicating the possible breakage of the pairing between the watch and the portable electronic device, the server issues a command to the portable electronic device.

7. The watch according to claim 6, wherein the command requesting the portable electronic device to wipe out a crowd source application, which, upon execution, enables the portable electronic device to upload collected data to the server.

8. The watch according to claim 1, wherein the alerting input indicates a panic or duress call.

9. The watch according to claim 1, wherein the short-range pairing mechanism is Bluetooth, near field communication, infrared, or Wi-Fi.

10. The watch according to claim 1, wherein the portable electronic device is a mobile phone, a laptop, a WiFi-enabled vehicle or a tablet.

11. The watch according to claim 1, further comprises a pre-built button, wherein the alerting input is input by the user by pressing on the pre-built button.

12. A method of monitoring a pairing with a portable electronic device of a security system including a server, the method comprising:
 establishing, by a watch, a pairing between the watch and the portable electronic device through a short-range pairing mechanism,
 receive, from a user, an alerting input indicating possible breakage of pairing with the portable electronic device, and
 upon receipt of the alerting input from the user transmitting information indicating the possible breakage of the pairing to the server directly, or via the portable electronic device prior to breakage of the pairing with the portable electronic device.

13. The method according to claim 12, wherein the transmitting information indicating the possible breakage of the pairing to the server comprises transmitting the information indicating the possible breakage of the paring to the portable electronic device via short-range communication to have the portable electronic device transfer the information to the server.

14. The method according to claim 12, wherein the alerting input indicates a panic or duress call.

15. The method according to claim 12, further comprises periodically detecting a signal from the portable electronic device after pairing with the portable electronic device is established.

16. A non-transitory computer-readable storage medium, having computer-executable instructions embodied thereon, wherein, upon executed by one or more processors of an watch, the computer-executable instructions cause the one or more processors to:
 establish a pairing with a portable electronic device through a short-range pairing mechanism,
 receive, from a user of the watch, an alerting input indicating possible breakage of pairing with the portable electronic device, and
 upon receipt of the alerting input from the user, transmit information indicating the possible breakage of the pairing to a server directly, or via the portable electronic device prior to breakage of the pairing with the portable electronic device.

17. The non-transitory computer-readable storage medium according to claim 16, wherein the computer-executable instructions further cause the one or more processors to periodically detect a signal from the portable electronic device after the pairing with the portable electronic device is established.

18. The non-transitory computer-readable storage medium according to claim 16, wherein the alerting input indicates a panic or duress call.

19. The non-transitory computer-readable storage medium according to claim 16, wherein the computer-executable instructions further cause the one or more processors to transmit the information indicating the possible breakage of the paring to the portable electronic device via short-range communication to have the portable electronic device transfer the information to the server.

20. A security system for monitoring a pairing established between two devices via a short-range pairing mechanism, comprising:
 a server, and
 a watch including:
  a communication circuitry configured to enable short-range communication between the watch and the portable electronic device, and
  a processing system including a processor, the processing system being configured to:
   establish a pairing with a portable electronic device through a short-range pairing mechanism,
   receive, from a user of the watch, an alerting input indicating possible breakage of pairing with the portable electronic device, and
   upon receipt of the alerting input from the user, transmit information indicating the possible breakage of the pairing to the server directly, or via the portable electronic device prior to breakage of the pairing with the portable electronic device,
  wherein the server is configured to receive the information indicating the possible breakage of the pairing from the watch or portable electronic device.

21. The non-transitory computer-readable storage medium according to claim 20, wherein the processing system of the watch is configured to transmit the information indicating the possible breakage of the paring to the portable electronic device via short-range communication to have the portable electronic device transfer the information to the server.

22. The security system according to claim 20, wherein the server is further configured to send a message to another electronic device after receiving the information indicating the possible breakage of the pairing between the watch and the portable electronic device.

23. The security system according to claim 22, wherein the message sent to one or more other electronic devices by the server indicates the possible breakage of the pairing between the watch and the portable electronic device.

24. The security system according to claim 20, wherein the the watch further comprises a pre-built button,
 the alerting input is input by the user by pressing on the pre-built button, and the alerting input indicates a panic or duress call.

25. The security system according to claim 20, wherein the server is further configured to issue a command to the portable electronic device after receiving the information indicating the possible breakage of the pairing.

26. The security system according to claim 20, wherein the portable electronic device is further configured to execute a crowd source application, which, upon execution, enables the portable electronic device to upload collected data to the server.

27. The security system according to claim 20, wherein the server is further configured to issue a command to the portable electronic device after receiving the information indicating the possible breakage of the pairing, and the portable electronic device is further configured to wipe out the crowd source application upon receipt of the command from the server.

28. The security system according to claim 20, wherein the processing system of the watch is configured to periodically detect a signal from the portable electronic device after the pairing with the portable electronic device is established.

* * * * *